United States Patent
Yasuhara et al.

(10) Patent No.: US 8,585,133 B2
(45) Date of Patent: Nov. 19, 2013

(54) VEHICLE BODY FRAME STRUCTURE

(75) Inventors: Shigeto Yasuhara, Wako (JP); Yasuhisa Egawa, Wako (JP); Ken Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 527 days.

(21) Appl. No.: 12/668,596

(22) PCT Filed: Jul. 8, 2008

(86) PCT No.: PCT/JP2008/062335
§ 371 (c)(1),
(2), (4) Date: Jan. 11, 2010

(87) PCT Pub. No.: WO2009/008426
PCT Pub. Date: Jan. 15, 2009

(65) Prior Publication Data
US 2010/0171340 A1 Jul. 8, 2010

(30) Foreign Application Priority Data

Jul. 12, 2007 (JP) .................................. 2007-183545
Jul. 12, 2007 (JP) .................................. 2007-183546

(51) Int. Cl.
*B62D 21/02* (2006.01)
(52) U.S. Cl.
USPC ................... 296/204; 296/203.03; 296/187.09
(58) Field of Classification Search
USPC ........... 296/204, 205, 187.09, 203.03, 203.02
See application file for complete search history.

(56) References Cited

U.S. PATENT DOCUMENTS

| 5,806,918 A | 9/1998 | Kanazawa | |
|---|---|---|---|
| 2003/0137163 A1* | 7/2003 | Hayashi et al. | 296/204 |
| 2005/0082879 A1* | 4/2005 | Goto et al. | 296/204 |
| 2007/0176443 A1* | 8/2007 | Yasuhara et al. | 293/133 |
| 2008/0258506 A1* | 10/2008 | Egawa et al. | 296/204 |

FOREIGN PATENT DOCUMENTS

| JP | 64-26581 | 2/1989 |
|---|---|---|
| JP | 4-75782 | 7/1992 |
| JP | 05-116647 | 5/1993 |
| JP | 9-66864 | 3/1997 |
| JP | 10297527 A * | 11/1998 |
| JP | 11-157468 | 6/1999 |
| JP | 3137881 | 2/2001 |
| JP | 2004-155350 | 6/2004 |
| JP | 2005-138652 | 6/2005 |

(Continued)

*Primary Examiner* — Glenn Dayoan
*Assistant Examiner* — Melissa A Black
(74) *Attorney, Agent, or Firm* — Rankin, Hill & Clark LLP (57) ABSTRACT

An automobile vehicle compartment includes an octagonal frame having side sills that extend in the vehicle body fore-and-aft direction, a dashboard lower cross member and middle cross member that extend in the vehicle width direction, and four inclined members, and it is therefore possible to ensure that there is sufficient rigidity both for a collision load from the vehicle body fore-and-aft direction and from the side of the vehicle body, thereby minimizing deformation of the vehicle compartment. Furthermore, since front side frames and a front bumper beam form a U-shaped frame that curves in a U-shape toward the vehicle body fore-and-aft direction in front of the vehicle compartment, it is possible by crushing of the high rigidity U-shaped frame to absorb effectively a collision load from the vehicle body fore-and-aft direction, including an offset collision, thereby preventing more effectively deformation of the vehicle compartment.

16 Claims, 7 Drawing Sheets (56) References Cited

FOREIGN PATENT DOCUMENTS

| JP | 2005-162144 | 6/2005 |
|----|-------------|--------|
| JP | 2005-206108 | 8/2005 |
| JP | 2005-231436 | 9/2005 |
| JP | 2005-231477 | 9/2005 |
| JP | 2005-335619 | 12/2005 |
| JP | 2006-297966 | 11/2006 |
| JP | 2006-347348 | 12/2006 |

* cited by examiner

(A) WHEN THERE IS A HEAD-ON OR REAR-END COLLISION (B) WHEN THERE IS A SIDE COLLISION

VEHICLE BODY FRAME STRUCTURE

TECHNICAL FIELD

The present invention relates to a vehicle body frame structure for protecting a vehicle compartment or fuel tank housing part of an automobile from a collision load.

The present invention also relates to a vehicle body frame structure that includes front side frames disposed in the vehicle body fore-and-aft direction on opposite left and right sides of an engine compartment, side sills disposed in the vehicle body fore-and-aft direction on opposite left and right sides of a vehicle compartment, a center frame disposed in the vehicle body fore-and-aft direction in a middle part, in the vehicle width direction, of the vehicle compartment, and a coupling member that couples the rear end of the front side frame, the front end of the side sill, and the front end of the center frame.

BACKGROUND ART

An arrangement in which collision force absorption and dispersion means formed from a U-shaped frame and collision force dispersion reinforcing means formed from a V-shaped frame are arranged in a vehicle body front part in the fore-and-aft direction, the U-shaped frame deforms to thus absorb the load of a head-on collision, and the V-shaped frame transmits a collision load from an engine cross member to a front frame to thus suppress deformation of the front frame and prevent the front frame from intruding into the vehicle compartment is known from Patent Publication 1 below.

Furthermore, a frame structure (conventional example) in which the rear end of a front side frame disposed in an engine compartment and the front end of a side sill disposed in a side part of a vehicle compartment are connected via an outrigger extending in the vehicle width direction, and a frame structure (first and second embodiments) in which the rear end of a front side frame disposed in an engine compartment and the front end of a floor frame disposed in a middle part of a vehicle compartment are connected via an outrigger extending in the vehicle width direction are known from Patent Publication 2 below.

Patent Publication 1: Japanese Patent Application Laid-open No. 11-157468
Patent Publication 2: Japanese Patent No. 3137881

DISCLOSURE OF INVENTION

Problems to be Solved by the Invention

The arrangement disclosed in Patent Publication 1 above has the problem that, since it is necessary to provide the U-shaped frame and the V-shaped frame in addition to the existing front frame in the engine compartment, which is in a vehicle body front part, not only does the vehicle body weight increase, thus increasing fuel consumption, but also the U-shaped frame and the V-shaped frame, which are disposed on a central line of the vehicle body, interfere with mounting of an engine and, moreover, the engine compartment becomes long in the fore-and-aft direction, thus compressing the space within the vehicle compartment.

Furthermore, the arrangement disclosed in Patent Publication 2 has the possibility that, since the outrigger is disposed in the vehicle width direction, the outrigger would be easily deformed by a load inputted into the front side frame, and the load inputted into the front side frame would not be transmitted efficiently to the side sill or the floor frame and absorbed.

The present invention has been attained in the light of the above-mentioned circumstances, and it is a first object of the present invention to achieve a balance between absorption of a collision load and protection of a vehicle compartment when a vehicle is involved in a collision, without increasing the vehicle body weight.

Furthermore, it is a second object of the present invention to efficiently transmit a collision load inputted into a front side frame to a side sill and a center frame and absorb it.

Means for Solving the Problems

In order to attain the first object, according to a first aspect of the present invention, there is proposed a vehicle body frame structure wherein a protection area of an automobile vehicle body comprises an octagonal frame having a pair of left and right longitudinal members that extend in the vehicle body fore-and-aft direction, a pair of front and rear lateral members that extend in the vehicle width direction, and four inclined members obliquely coupling end parts of the longitudinal members and lateral members, and an energy absorption area connected to the protection area and positioned in an end part in vehicle body fore-and-aft direction comprises a U-shaped frame that curves in a U-shape toward the vehicle body fore-and-aft direction.

According to a second aspect of the present invention, in addition to the first aspect, the protection area is a vehicle compartment, and the energy absorption area is an engine compartment.

According to a third aspect of the present invention, in addition to the first aspect, the protection area is a fuel tank housing part, and the energy absorption area is a trunk compartment.

According to a fourth aspect of the present invention, in addition to any one of the first to third aspects, the U-shaped frame is formed from a front bumper beam and left and right upper members.

According to a fifth aspect of the present invention, in addition to any one of the first to third aspects, the U-shaped frame is formed from a front bumper beam and left and right front side frames.

In order to attain the second object, according to a sixth aspect of the present invention, there is proposed a vehicle body frame structure comprising front side frames disposed in the vehicle body fore-and-aft direction on opposite left and right sides of an engine compartment, side sills disposed in the vehicle body fore-and-aft direction on opposite left and right sides of a vehicle compartment, a center frame disposed in the vehicle body fore-and-aft direction in a middle part, in the vehicle width direction, of the vehicle compartment, and a coupling member that couples the rear end of the front side frame, the front end of the side sill, and the front end of the center frame, characterized in that the coupling member comprises an outrigger that extends from the rear end of the front side frame obliquely rearward toward the outer side in the vehicle width direction and is connected to the front end of the side sill, and a center frame extension that extends from the rear end of the front side frame obliquely rearward toward the inner side in the vehicle width direction and is connected to the front end of the center frame.

According to a seventh aspect of the present invention, in addition to the sixth aspect, a front subframe mounting portion on which the rear end of the front subframe is mounted is provided at the front end of the center frame extension of the coupling member.

According to an eighth aspect of the present invention, in addition to the seventh aspect, the outrigger, the center frame extension, and the front subframe mounting portion of the coupling member are formed from one continuous member.

An engine compartment 11 and a trunk compartment 16 of an embodiment correspond to the energy absorption area of the present invention, a vehicle compartment 13 and a fuel tank housing part 15 of the embodiment correspond to the protection area of the present invention, a side sill 14 and a rear side frame 17 of the embodiment correspond to the longitudinal member of the present invention, a dashboard lower cross member 22, middle cross member 24, and rear cross member 25 of the embodiment correspond to the lateral member of the present invention, and an outrigger 30b, gussets 38 and 39, and an enlarged width portion 25a of the embodiment correspond to the inclined member of the present invention.

Effects of the Invention

In accordance with the first aspect of the present invention, since the protection area of the automobile vehicle body includes the octagonal frame having the pair of left and right longitudinal members that extend in the vehicle body fore-and-aft direction, the pair of front and rear lateral members that extend in the vehicle width direction, and the four inclined members obliquely coupling end parts of the longitudinal members and lateral members, it is possible to ensure that there is sufficient rigidity both for a collision load from the vehicle body fore-and-aft direction and a collision load from the side of the vehicle body, thereby minimizing deformation of the protection area. Furthermore, since the energy absorption area connected to the protection area and positioned in the end part in the vehicle body fore-and-aft direction includes the U-shaped frame that curves in a U-shape toward the vehicle body fore-and-aft direction, it is possible to absorb effectively a collision load from the vehicle body fore-and-aft direction, including an offset collision, due to the high rigidity U-shaped frame being crushed, thereby preventing more effectively deformation of the protection area. Moreover, since it is unnecessary to provide a special reinforcing member, it is possible to achieve a balance between absorption of a collision load and protection of a vehicle compartment without this being accompanied by an increase in weight.

Furthermore, in accordance with the second aspect of the present invention, since the protection area is the vehicle compartment and the energy absorption area is the engine compartment, it is possible by crushing of the U-shaped frame of the engine compartment to absorb effectively a collision load inputted from the front of the vehicle body and by the high rigidity octagonal frame to prevent deformation of the vehicle compartment, thus protecting an occupant.

Moreover, in accordance with the third aspect of the present invention, since the protection area is the fuel tank housing part and the energy absorption area is the trunk compartment, it is possible by crushing of the U-shaped frame of the trunk compartment to effectively absorb a collision load inputted from the rear of the vehicle body and by the high rigidity octagonal frame to prevent deformation of the fuel tank housing part, thus protecting a fuel tank.

Furthermore, in accordance with the sixth aspect of the present invention, since the coupling member, which couples the rear end of the front side frame disposed in the vehicle body fore-and-aft direction in the engine compartment, the front end of the side sill disposed in the vehicle body fore-and-aft direction in the side of the vehicle compartment, and the front end of the center frame disposed in the vehicle body fore-and-aft direction in the middle part of the vehicle compartment, includes the outrigger, which extends from the rear end of the front side frame obliquely rearward toward the outer side in the vehicle width direction and is connected to the front end of the side sill, and the center frame extension, which extends from the rear end of the front side frame obliquely rearward toward the inner side in the vehicle width direction and is connected to the front end of the center frame, it is possible to disperse a rearward collision load inputted into the front side frame, when the vehicle is involved in a collision, between the side sill and the center frame via the outrigger and the center frame extension of the coupling member, thereby minimizing deformation of the vehicle compartment due to the collision load. In this case, since the outrigger and the center frame extension of the coupling member are inclined relative to the vehicle width direction, it does not deform itself but transmit the collision load efficiently to the side sill and the center frame.

Moreover, in accordance with the seventh aspect of the present invention, since the front subframe mounting portion, on which the rear end of the front subframe is mounted, is provided at the front end of the center frame extension of the coupling member, when a load is inputted from the front into the front subframe when the vehicle is involved in a head-on collision, the reaction acts on the front subframe from the coupling member connected to the side sill and the center frame, thus enabling the front subframe to be reliably crushed and the collision load to be absorbed.

Furthermore, in accordance with the eighth aspect of the present invention, since the outrigger, the center frame extension, and the front subframe mounting portion of the coupling member are formed from one continuous member, compared with a case in which they are formed from separate members not only is it possible to improve the strength and reliably transmit the load, but it is also possible to reduce the number of components, thus cutting the cost.

EXPLANATION OF REFERENCE NUMERALS AND SYMBOLS

11 Engine compartment (energy absorption area)
12 Front side frame
13 Vehicle compartment (protection area)
14 Side sill (longitudinal member)
15 Fuel tank housing part (protection area)
16 Trunk compartment (energy absorption area)
17 Rear side frame (longitudinal member)
19 Upper member 21 Front bumper beam
22 Dashboard lower cross member (lateral member)
24 Middle cross member (lateral member)
25 Rear cross member (lateral member)
25a Enlarged width portion (inclined member)
29 Center frame
30 Coupling member
30a Front subframe mounting portion
30b Outrigger (inclined member)
30c Center frame extension
31 Front subframe
38 Gusset (inclined member)
39 Gusset (inclined member)

BEST MODE FOR CARRYING OUT THE INVENTION

A mode for carrying out the present invention is explained below by reference to FIG. 1 to FIG. 7.

Figure 1:
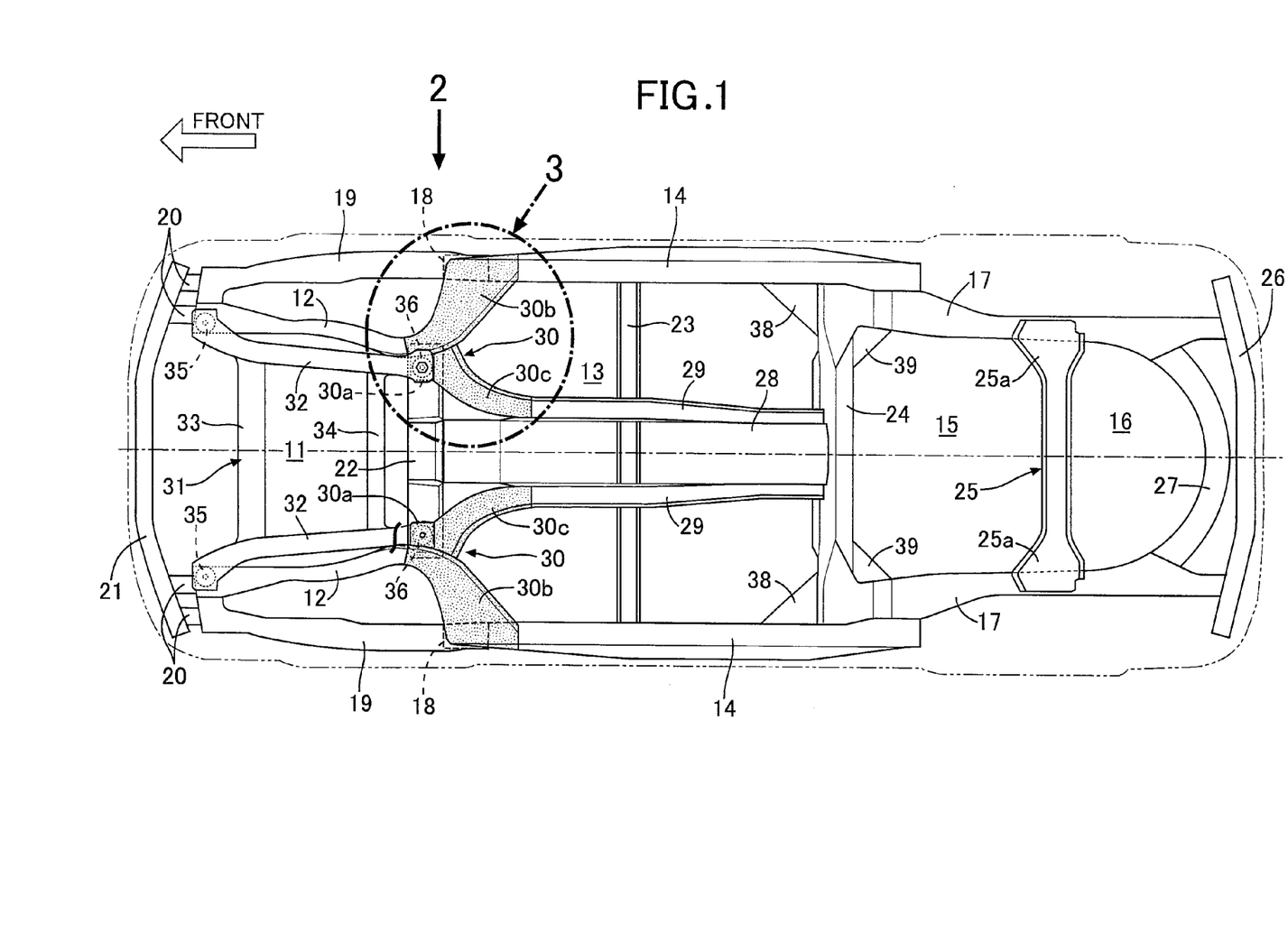
FIG. 1 A view of a vehicle body frame of an automobile from the underside. (first embodiment)
Figure 2:
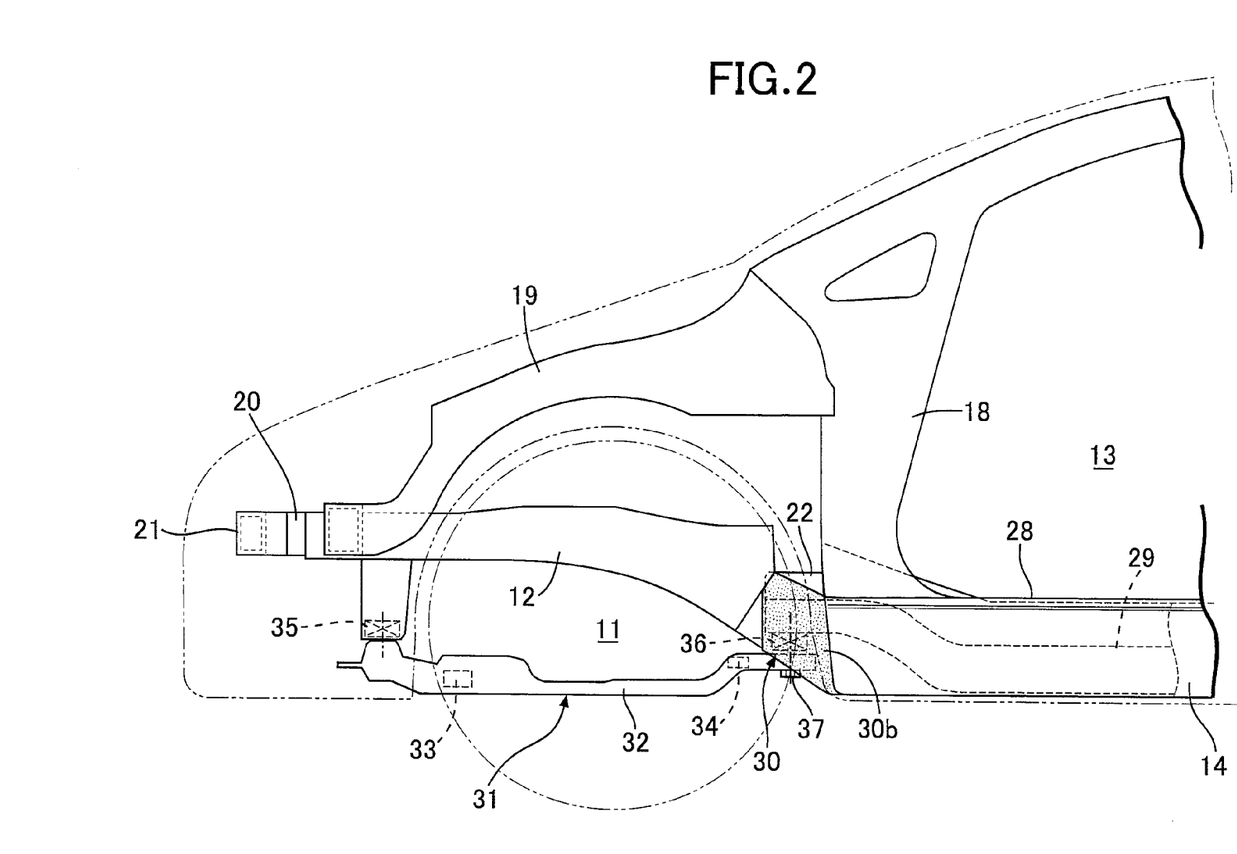
FIG. 2 A view from arrow 2 in FIG. 1. (first embodiment)

As shown in FIG. 1 and FIG. 2, a vehicle body frame of an automobile includes a pair of left and right front side frames 12 and 12 that extend in the vehicle body fore-and-aft direction along opposite left and right side parts of an engine compartment 11, a pair of left and right side sills 14 and 14 that extend in the vehicle body fore-and-aft direction along opposite left and right side parts of a vehicle compartment 13, a pair of left and right rear side frames 17 and 17 that extend in the vehicle body fore-and-aft direction along opposite left and right side parts of a fuel tank housing part 15 and a trunk compartment 16, a pair of left and right upper members 19 and 19 that extend from the front end of the front side frames 12 and 12 upward to the rear and are coupled to the upper end of a pair of left and right front pillar lowers 18 and 18 rising from the front end of the left and right side sills 14 and 14, a front bumper beam 21 that extends in the vehicle width direction and has opposite ends connected to the front ends of the front side frames 12 and 12 via front side frame extensions 20, a dashboard lower cross member 22 that extends in the vehicle width direction and provides a connection between the rear ends of the left and right front side frames 12 and 12, a front cross member 23 that extends in the vehicle width direction and provides a connection between middle parts, in the fore-and-aft direction, of the left and right side sills 14 and 14, a middle cross member 24 that extends in the vehicle width direction and provides a connection between the front ends of the left and right rear side frames 17 and 17, a rear cross member 25 that extends in the vehicle width direction and provides a connection between middle parts, in the fore-and-aft direction, of the left and right rear side frames 17 and 17, a rear bumper beam 26 that extends in the vehicle width direction and provides a connection between the rear ends of the left and right rear side frames 17 and 17, a rear end frame 27 that extends in the width direction and connects the left and right rear side frames 17 and 17 together between the rear cross member 25 and the rear bumper beam 26, a pair of left and right center frames 29 and 29 that extend along opposite left and right sides of a floor tunnel 28 extending from the dashboard lower cross member 22 to the middle cross member 24, a pair of left and right coupling members 30 and 30 that couple the front side frames 12 and 12, the side sills 14 and 14, and the center frames 29 and 29, and a front subframe 31 that is supported on a lower part of the left and right front side frames 12 and 12.

The front subframe 31 is formed by connecting a pair of left and right longitudinal frames 32 and 32 to a pair of front and rear lateral frames 33 and 34 in a rectangular frame shape; the front ends of the longitudinal frames 32 and 32 are resiliently supported on a lower face of the front ends of the front side frames 12 and 12 via rubber bush joints 35 and 35, and the rear ends of the longitudinal frames 32 and 32 are resiliently supported on a lower face of the coupling members 30 and 30 via rubber bush joints 36 and 36.

The structure of the coupling members 30 and 30 is now explained by reference to FIG. 1 to FIG. 4. Since the left and right coupling members 30 and 30 have a mirror symmetric shape, one thereof is explained.

The coupling member 30, which is shown by shading in FIG. 1, is formed as a single member by press-molding a metal panel, and includes at the front end a front subframe mounting portion 30a projecting downward in a cup shape; an outrigger 30b extends obliquely outward in the vehicle width direction and rearward from the front subframe mounting portion 30a, and a center frame extension 30c extends obliquely inward in the vehicle width direction and rearward from the front subframe mounting portion 30a.

Opposite left and right end parts of the dashboard lower cross member 22 are connected to an inner face in the vehicle width direction of the center frame extension 30c that is adjacent to the front subframe mounting portion 30a of the coupling member 30, and the rear end of the center frame extension 30c extending therefrom obliquely rearward is connected to the front end of the center frame 29. The front end of the outrigger 30b of the coupling member 30 is connected to the rear end of the front side frame 12, and the rear end is connected to the front end of the side sill 14.

Figure 4:
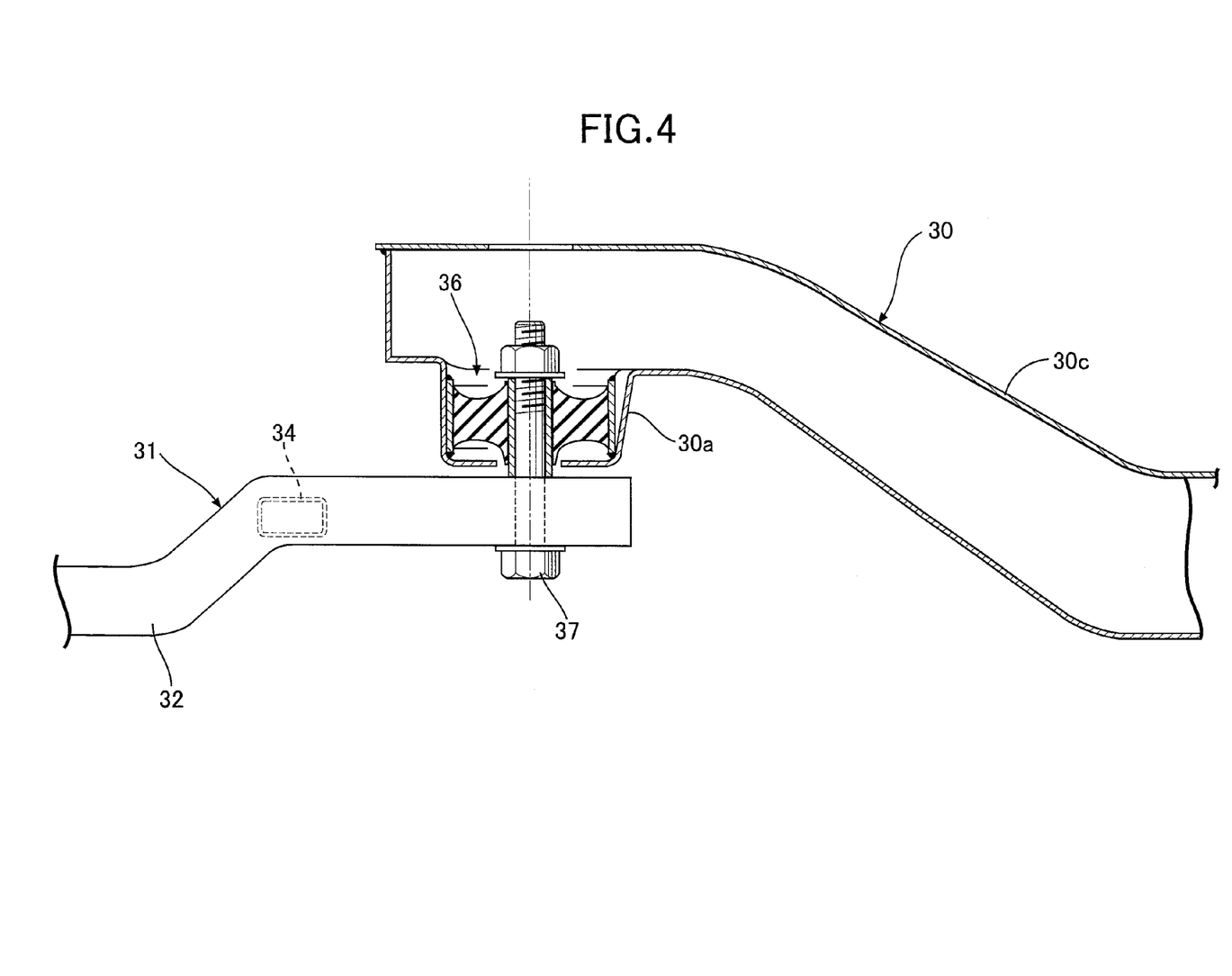
FIG. 4 A sectional view along line 4-4 in FIG. 3. (first embodiment)

The rubber bush joint 36 is housed within the front subframe mounting portion 30a of the coupling member 30, and a rear part of the front subframe 31 is supported on a bolt 37 running through the rubber bush joint 36 (see FIG. 4). The front part of the front subframe 31 is also supported on the lower face of the front side frame 12 via the rubber bush joint 35 (see FIG. 1), which has the same structure.

Figure 5:
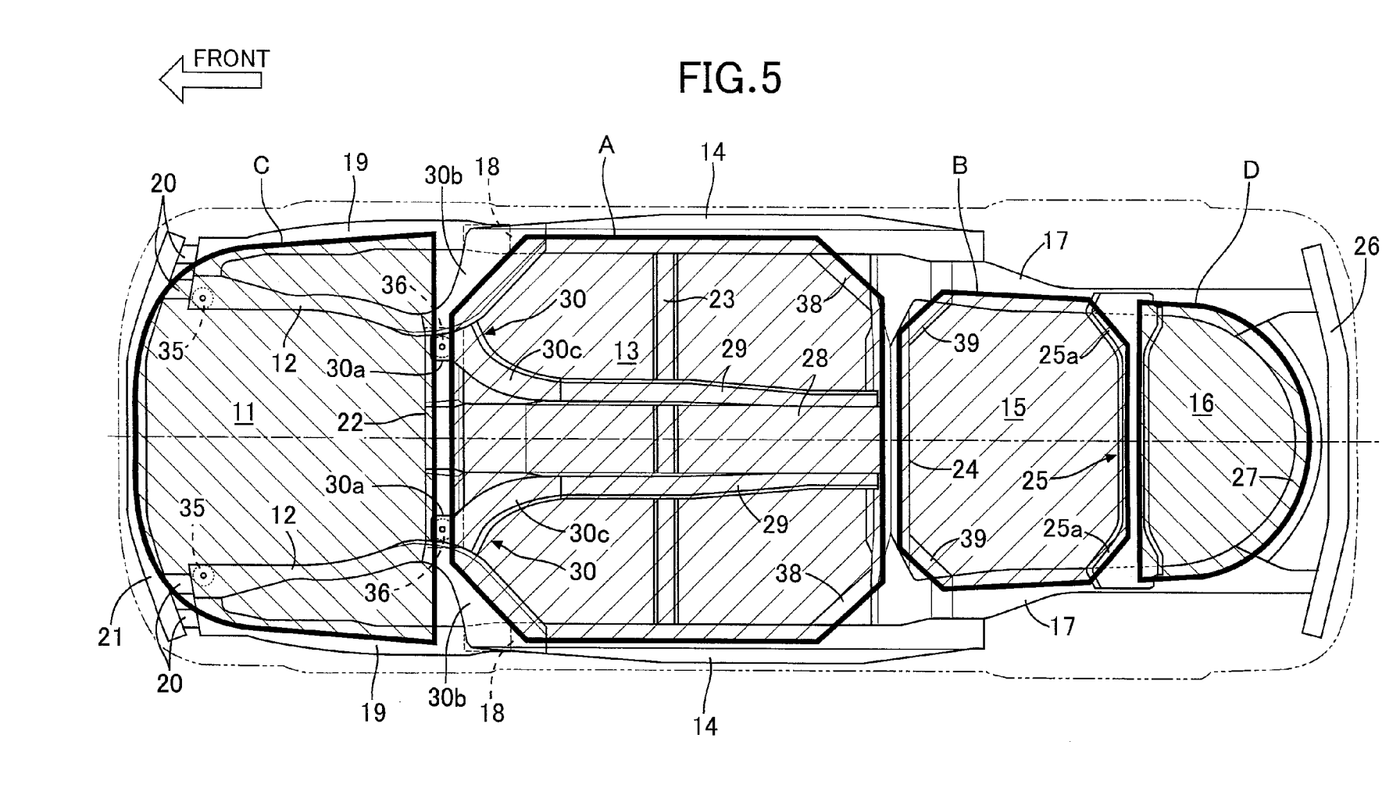
FIG. 5 A view in which the shapes of protection areas and energy absorption areas have been added to FIG. 1. (first embodiment)

As is clear from referring to FIG. 1 and FIG. 5 together, a frame surrounding the vehicle compartment 13, which is a first protection region, is formed in an octagonal shape in plan view. That is, the left and right side sills 14 and 14 extending in the vehicle body fore-and-aft direction, the dashboard lower cross member 22 and middle cross member 24 extending in the vehicle width direction, the left and right outriggers 30b and 30b obliquely connecting the front ends of the side sills 14 and 14 and opposite left and right ends of the dashboard lower cross member 22, and the left and right gussets 38 and 38 obliquely connecting the rear ends of the side sills 14 and 14 and opposite left and right ends of the middle cross member 24 form in their entirety an octagonal shape as shown by thick line A in FIG. 5.

Furthermore, a frame surrounding the fuel tank housing part 15, which is a second protection region, is formed in an octagonal shape in plan view. That is, the left and right rear side frames 17 and 17 extending in the vehicle body fore-and-aft direction, the middle cross member 24 and rear cross member 25 extending in the vehicle width direction, the left and right gussets 39 and 39 obliquely connecting the front ends of the rear side frames 17 and 17 and opposite left and right ends of the middle cross member 24, and enlarged width portions 25a and 25a formed by enlarging obliquely forwardly opposite left and right ends of the rear cross member 25 connected to the rear side frames 17 and 17 form in their entirety an octagonal shape as shown by thick line B in FIG. 5.

Furthermore, a frame surrounding the engine compartment 11, which is disposed in front of the vehicle compartment 13 and forms a first energy absorption region, has a substantially U-shaped form in plan view. That is, since the front bumper beam 21 curves so as to project on the front side of the vehicle body, the front bumper beam 21 and the front side frames 12 and 12 and upper members 19 and 19 extending from opposite ends, in the vehicle width direction, of the front bumper beam 21 toward the rear of the vehicle body form in their entirety a U-shape as shown by thick line C in FIG. 5.

Furthermore, a frame surrounding the trunk compartment 16, which is disposed to the rear of the fuel tank housing part 15 and forms a second energy absorption region, has a substantially U-shaped form in plan view. That is, since the rear end frame 27 is curved so as to project on the rear side of the vehicle body, the rear end frame 27 and the rear side frames 17 and 17 extending from opposite ends, in the vehicle width direction, of the rear end frame 27 toward the front of the vehicle body form in their entirety a U-shape as shown by thick line D in FIG. 5.

The operation of the embodiment of the present invention having the above arrangement is now explained.

Figure 6:
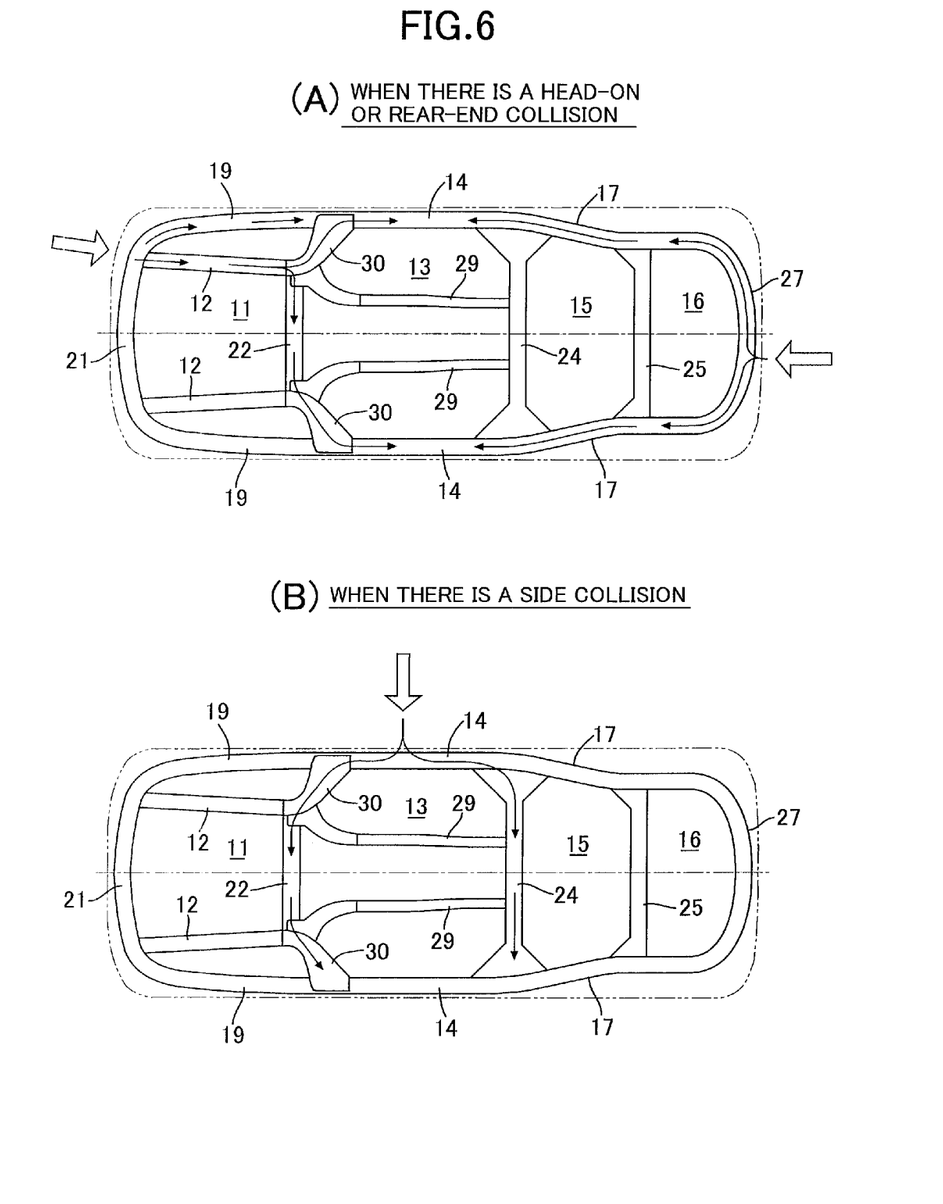
FIG. 6 A view showing a load transmission route when there is a head-on/rear-end collision and when there is a side collision. (first embodiment)

As is clear from FIG. 5 and FIG. 6, since the front bumper beam 21, which curves so as to project on the front side of the vehicle body, and the front side frames 12 and 12 and upper members 19 and 19, which extend from opposite ends, in the vehicle width direction, of the front bumper beam 21 toward the rear of the vehicle body, form in their entirety a U-shape, they have high rigidity toward a collision load inputted from the front of the vehicle body due to a collision of the vehicle, and they exhibit a large effect in absorbing an impact when they are crushed, thereby minimizing deformation of the vehicle compartment 13.

Furthermore, since the side sills 14 and 14, the dashboard lower cross member 22 and middle cross member 24, the left and right outriggers 30b and 30b obliquely connecting the front ends of the side sills 14 and 14 and opposite left and right ends of the dashboard lower cross member 22, and the left and right gussets 38 and 38 obliquely connecting the rear ends of the side sills 14 and 14 and opposite left and right ends of the middle cross member 24, which surround the vehicle compartment 13, form an octagonal frame, the rigidity increases compared with that of a rectangular frame, thus suppressing more effectively deformation of the vehicle compartment 13. This is because the shape that has the highest deformation resistance to an external force is a circle, and an octagon is closer to a circle than is a rectangle. This octagonal frame structure can minimize deformation of the vehicle compartment 13 not only when there is a head-on collision but also when there is a side collision in which a load is inputted from the side sills 14 and 14.

Similarly, since the rear end frame 27, which curves so as to project on the rear side of the vehicle body, and the rear side frames 17 and 17, which extend from opposite ends, in the vehicle width direction, of the rear end frame 27 toward the front of the vehicle body, form in their entirety a U-shape, they have high rigidity toward a collision load inputted from the rear of the vehicle body due to collision of the vehicle, and they exhibit a large effect in absorbing impact when they are crushed, thereby minimizing deformation of the fuel tank housing part 15 and preventing the fuel tank from being damaged.

Furthermore, since the rear side frames 17 and 17, the middle cross member 24 and rear cross member 25 extending in the vehicle width direction, the left and right gussets 39 and 39 obliquely connecting the front ends of the rear side frames 17 and 17 and opposite left and right ends of the middle cross member 24, and the enlarged width portions 25a and 25a formed by enlarging obliquely forwardly opposite left and right ends of the rear cross member 25 connected to the rear side frames 17 and 17, which surround the fuel tank housing part 15, form in their entirety an octagonal shape, the rigidity increases compared with that of a rectangular frame, thus suppressing deformation of the fuel tank housing part 15 more effectively. This octagonal frame structure can minimize deformation of the fuel tank housing part 15 not only when there is a rear-end collision but also when there is a side collision in which a load is inputted from the rear side frames 17 and 17.

Figure 3:
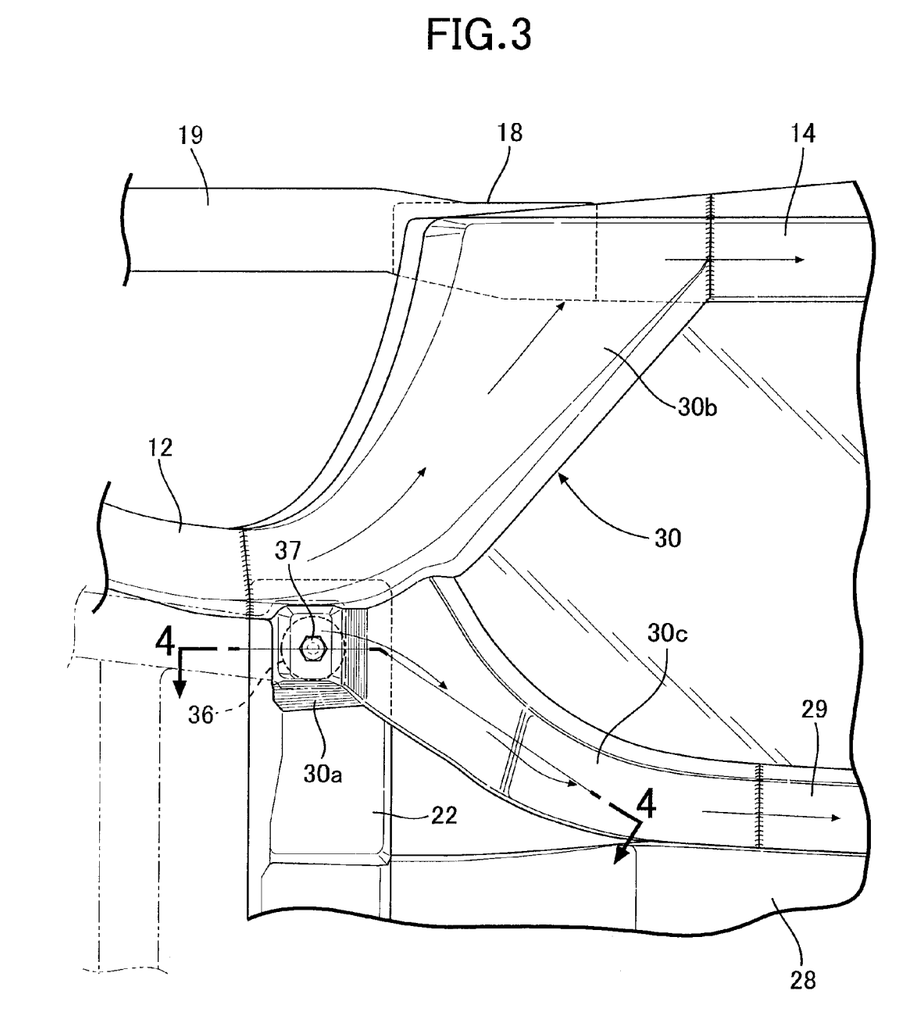
FIG. 3 An enlarged view of part 3 in FIG. 1. (first embodiment)

When a rearward load acts on the front side frame 12 when there is a vehicle head-on collision, as shown in FIG. 3, the load is transmitted to the side sill 14 and the center frame 29 via the coupling member 30 and dispersed. In this case, since the outrigger 30b of the coupling member 30 extends obliquely rearward to the outer side in the vehicle width direction, compared with a case in which it extends straight ahead in the vehicle width direction, the load from the front side frame 12 can be transmitted efficiently to the side sill 14. Furthermore, since the center frame extension 30c of the coupling member 30 extends obliquely rearward to the inner side in the vehicle width direction, compared with a case in which it extends straight ahead in the vehicle width direction, the load from the front side frame 12 can be transmitted efficiently to the center frame 29.

Moreover, since the coupling member 30 is formed from the single member, which includes the front subframe mounting portion 30a, the outrigger 30b, and the center frame extension 30c, compared with a case in which they are formed from separate members and integrally joined, not only can the number of components be reduced, but the strength of the coupling member 30 also increases. It is also possible to reinforce a portion of the coupling member 30 where strength is required by superimposing a blank thereon.

Figure 7:
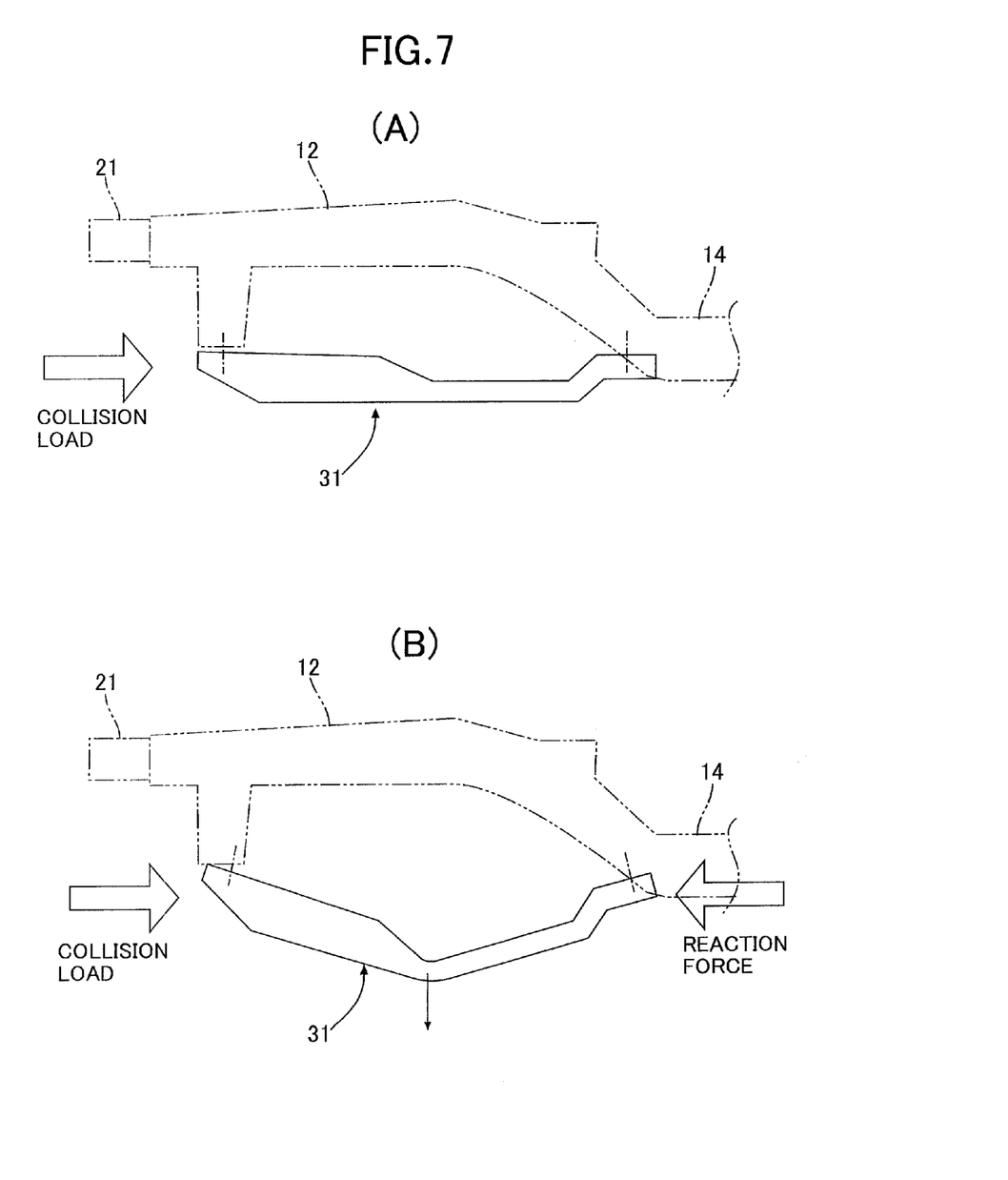
FIG. 7 A view for explaining deformation of a front subframe when there is a head-on collision. (first embodiment)

Furthermore, since the front subframe mounting portion 30a is provided at the front end of the center frame extension 30c of the coupling member 30, when there is a head-on collision a reaction force acts on the front subframe 31 from the coupling member 30 side, and as shown in FIG. 7 deformation of the vehicle compartment 13 can be suppressed while absorbing collision energy by bending the front subframe 31.

Moreover, left and right front seats are disposed to the rear of the front subframe 31, and since positions corresponding to the area beneath the legs of occupants seated on these front seats are reinforced by the high rigidity coupling members 30 and 30, it is possible to protect the occupants' legs from the impact of a head-on collision.

An embodiment of the present invention is explained above, but the present invention may be modified in a variety of ways as long as the modifications do not depart from the spirit and scope of the present invention.

For example, in the embodiment, the frame structure of the present invention is applied to the engine compartment 11 and vehicle compartment 13 on the front side and the trunk compartment and fuel tank housing part 15 on the rear side, but it may be applied to only one of either the front side or the rear side.

Furthermore, in the embodiment, the gussets 38 and 39 are formed from a member separate from the middle cross member 24, but they may be formed integrally by increasing the width of opposite ends of the middle cross member 24.

Moreover, the coupling member 30 of the embodiment includes the front subframe mounting portion 30a, but the front subframe mounting portion 30a is not always required.

The invention claimed is:

1. A vehicle body frame structure wherein,
  a frame surrounding a vehicle compartment is formed of a first octagonal shape by: a pair of left and right side sills;

a dashboard lower cross member; a middle cross member; a pair of outriggers obliquely connecting front ends of the side sills and opposite left and right ends of the dashboard lower cross member; and a pair of gussets obliquely connecting rear ends of the side sills and opposite left and right ends of the middle cross member, a frame surrounding an engine compartment positioned frontward of the vehicle compartment is formed of upper and lower U-shapes, the lower U-shape being defined by a common front bumper beam which is curved so as to project frontward, and a pair of front side frames which extend from the front bumper beam toward the first octagonal shape, the upper U-shape being defined by the common front bumper beam and a pair of upper members which extend from opposite left and right ends of the front bumper beam in an upward and rearward direction and outward of the front side frames toward the first octagonal shape, a frame surrounding a fuel tank housing part positioned rearward of the vehicle compartment is formed of a second octagonal shape by: a pair of rear side frames; the middle cross member of the first octagonal shape; a rear cross member; a pair of gussets obliquely connecting front ends of the rear side frames and the opposite left and right ends of the middle cross member; and a pair of enlarged width portions formed by enlarging obliquely forwardly opposite left and right ends of the rear cross member connected to the rear side frames, and a frame surrounding a trunk compartment positioned rearward of the fuel tank housing part is formed of an U-shape by: a rear end frame curved so as to project rearward; and the pair of rear side frames extending from opposite ends of the rear end frame toward the front of the vehicle body, wherein the pair of outriggers is in contact with the front ends of the side sills and the opposite left and right ends of the dashboard lower cross member respectively.

2. The vehicle body frame structure according to claim 1, wherein the outrigger obliquely connecting the front end of the left side sill and the left end of the dashboard lower cross member faces to the gusset obliquely connecting the rear end of the right side sill and the right end of the middle cross member within the octagonal shape of the frame surrounding the vehicle compartment, and the outrigger obliquely connecting the front end of the right side sill and the right end of the dashboard lower cross member faces to the gusset obliquely connecting the rear end of the left side sill and the left end of the middle cross member within the octagonal shape of the frame surrounding the vehicle compartment.

3. The vehicle body frame structure according to claim 1, wherein the gusset obliquely connecting the front end of the rear side frame and the opposite left end of the middle cross member faces to the enlarged width portion formed by enlarging obliquely forwardly opposite right end of the rear cross member connected to the rear side frame within the octagonal shape of the frame surrounding the fuel tank housing part, and the gusset obliquely connecting the front end of the rear side frame and the opposite right end of the middle cross member faces to the enlarged width portion formed by enlarging obliquely forwardly opposite left end of the rear cross member connected to the rear side frame within the octagonal shape of the frame surrounding the fuel tank housing part.

4. The vehicle body frame structure according to claim 1, wherein the pair of gussets is in contact with the front ends of the rear side frames and the opposite left and right ends of the middle cross member respectively.

5. The vehicle body frame structure according to claim 1, wherein the pair of enlarged width portions formed by enlarging obliquely forwardly opposite left and right ends of the rear cross member is in contact with the rear side frames respectively.

6. The vehicle body frame structure according to claim 1, wherein the upper member and a corresponding one of the side sills extend so as to form a straight line shape together when viewed in a plan view.

7. The vehicle body frame structure according to claim 1, wherein the upper member is coupled to a front pillar lower extending upward from a front end of a corresponding one of the side sills.

8. The vehicle body frame structure according to claim 1, wherein the first octagonal shape is adjacent to and larger than the second octagonal shape.

9. A vehicle body frame structure wherein, a frame surrounding a vehicle compartment is formed of a first octagonal shape by: a pair of left and right side sills; a dashboard lower cross member; a middle cross member; a pair of outriggers obliquely connecting front ends of the side sills and opposite left and right ends of the dashboard lower cross member; and a pair of gussets obliquely connecting rear ends of the side sills and opposite left and right ends of the middle cross member, a frame surrounding an engine compartment positioned frontward of the vehicle compartment is formed of upper and lower U-shapes, the lower U-shape being defined by a common front bumper beam which is curved so as to project frontward, and a pair of front side frames which extend from the front bumper beam toward the first octagonal shape, the upper U-shape being defined by the common front bumper beam and a pair of upper members which extend from opposite left and right ends of the front bumper beam in an upward and rearward direction and outward of the front side frames toward the first octagonal shape, a frame surrounding a fuel tank housing part positioned rearward of the vehicle compartment is formed of a second octagonal shape by: a pair of rear side frames; the middle cross member of the first octagonal shape; a rear cross member; a pair of gussets obliquely connecting front ends of the rear side frames and the opposite left and right ends of the middle cross member; and a pair of enlarged width portions formed by enlarging obliquely forwardly opposite left and right ends of the rear cross member connected to the rear side frames, and a frame surrounding a trunk compartment positioned rearward of the fuel tank housing part is formed of an U-shape by: a rear end frame curved so as to project rearward; and the pair of rear side frames extending from opposite ends of the rear end frame toward the front of the vehicle body, wherein the pair of outriggers is in contact with the front ends of the side sills and the opposite left and right ends of the dashboard lower cross member respectively and the pair of gussets is in contact with the rear ends of the side sills and the opposite left and right ends of the middle cross member respectively.

10. The vehicle body frame structure according to claim 9, wherein the outrigger obliquely connecting the front end of the left side sill and the left end of the dashboard lower cross member faces to the gusset obliquely connecting the rear end of the right side sill and the right end of the middle cross member within the octagonal shape of the frame surrounding the vehicle compartment, and the outrigger obliquely connecting the front end of the right side sill and the right end of the dashboard lower cross member faces to the gusset obliquely connecting the rear end of the left side sill and the left end of the middle cross member within the octagonal shape of the frame surrounding the vehicle compartment.

11. The vehicle body frame structure according to claim 9, wherein the gusset obliquely connecting the front end of the rear side frame and the opposite left end of the middle cross member faces to the enlarged width portion formed by enlarging obliquely forwardly opposite right end of the rear cross member connected to the rear side frame within the octagonal shape of the frame surrounding the fuel tank housing part, and the gusset obliquely connecting the front end of the rear side frame and the opposite right end of the middle cross member faces to the enlarged width portion formed by enlarging obliquely forwardly opposite left end of the rear cross member connected to the rear side frame within the octagonal shape of the frame surrounding the fuel tank housing part.

12. The vehicle body frame structure according to claim 9, wherein the pair of gussets is in contact with the front ends of the rear side frames and the opposite left and right ends of the middle cross member respectively.

13. The vehicle body frame structure according to claim 9, wherein the pair of enlarged width portions formed by enlarging obliquely forwardly opposite left and right ends of the rear cross member is in contact with the rear side frames respectively.

14. The vehicle body frame structure according to claim 9, wherein the upper member and a corresponding one of the side sills extend so as to form a straight line shape together when viewed in a plan view.

15. The vehicle body frame structure according to claim 9, wherein the upper member is coupled to a front pillar lower extending upward from a front end of a corresponding one of the side sills.

16. The vehicle body frame structure according to claim 9, wherein the first octagonal shape is adjacent to and larger than the second octagonal shape.

* * * * *